Figure 1:
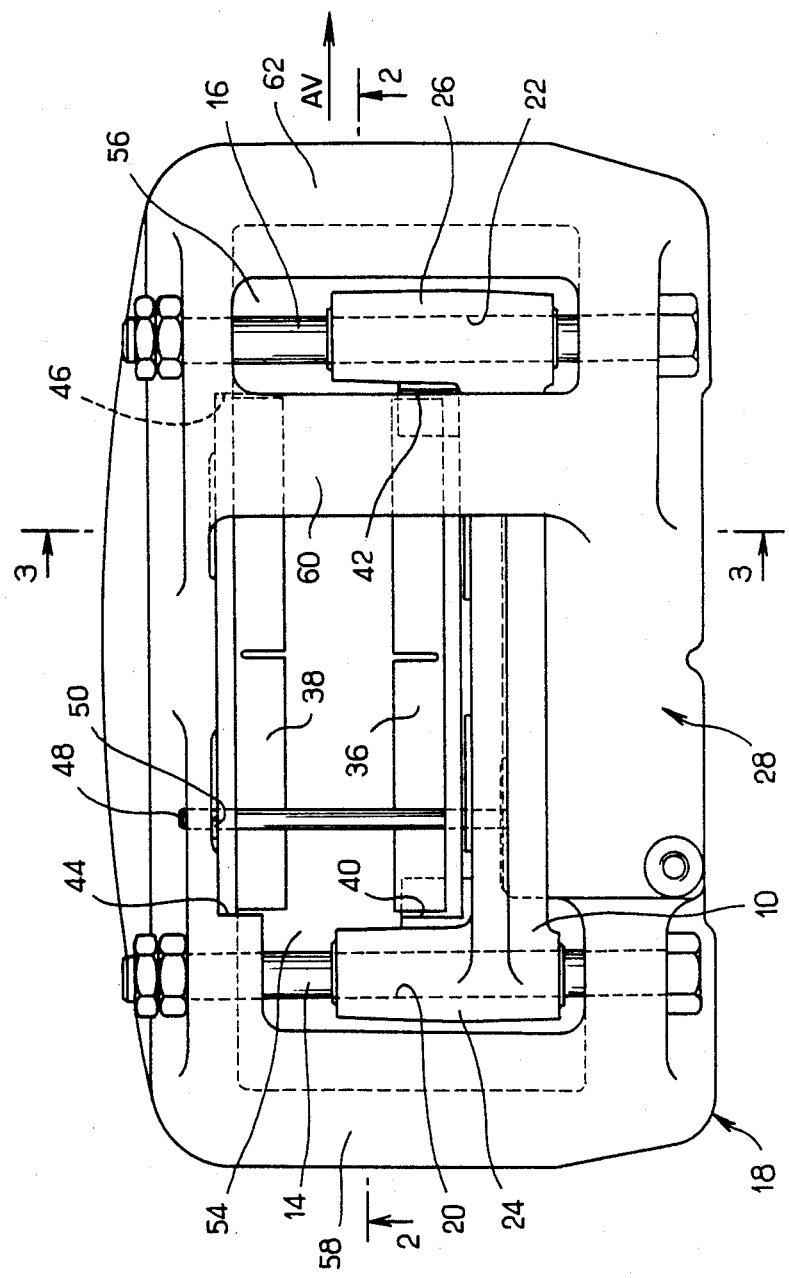

United States Patent [19]

Méry

[11] Patent Number: 4,609,079
[45] Date of Patent: Sep. 2, 1986

[54] SLIDING CALIPER DISC BRAKE

[75] Inventor: Jean-Claude Méry, Pavillons sous Bois, France

[73] Assignee: Societe Anonyme D.B.A., Paris, France

[21] Appl. No.: 767,651

[22] Filed: Aug. 19, 1985

Related U.S. Application Data

[63] Continuation of Ser. No. 571,753, Jan. 17, 1984, abandoned.

[30] Foreign Application Priority Data

Jan. 20, 1983 [FR] France ................. 83 00845

[51] Int. Cl.⁴ .............................................. F16D 65/14
[52] U.S. Cl. ................................. 188/73.45; 188/73.32
[58] Field of Search ............... 188/73.45, 73.44, 73.43, 188/73.47, 73.32

[56] References Cited

U.S. PATENT DOCUMENTS

| | | | |
|---|---|---|---|
| 3,388,775 | 6/1968 | Baynes et al. | 188/73.32 |
| 3,656,590 | 4/1972 | Newstead | 188/73.4 |
| 3,677,373 | 7/1972 | Lucien | 188/73.32 |
| 4,068,745 | 1/1978 | Haraikawa | 188/73.3 |
| 4,072,214 | 2/1978 | Haraikawa et al. | 188/72.4 |
| 4,072,216 | 2/1978 | Haraikawa | 188/73.45 X |
| 4,085,828 | 4/1978 | Thioux | 188/71.6 |
| 4,341,289 | 7/1982 | Smith | 188/73.39 |
| 4,373,616 | 2/1983 | Kondo | 188/73.45 |

FOREIGN PATENT DOCUMENTS

| | | | |
|---|---|---|---|
| 1390337 | 1/1965 | France . | |
| 1521762 | 3/1968 | France . | |
| 2226039 | 10/1974 | France . | |
| 2344751 | 10/1977 | France . | |
| 63562 | 5/1977 | Japan . | |
| 149629 | 9/1982 | Japan . | |
| 935995 | 9/1963 | United Kingdom | 188/73.32 |
| 1563213 | 3/1980 | United Kingdom . | |

Primary Examiner—George E. A. Halvosa
Attorney, Agent, or Firm—Larry J. Palguta; Ken C. Decker

[57] ABSTRACT

Disc brake having a caliper (18) mounted for sliding on a fixed support (10) by way of two axial pins (14, 16) passing through openings (20, 22) formed respectively in a rear arms (24) and in a front arm (26) of the fixed support (10). According to the invention, the caliper (18) has two openings (54, 56), the first opening (54) receiving the rear arm and the corresponding pins (14) and permitting the radial extraction of the friction elements (36, 38), and the second opening (56) receiving the front arm (26) and the corresponding pins (16).

5 Claims, 3 Drawing Figures

FIG_1

SLIDING CALIPER DISC BRAKE

This is a continuation of application Ser. No. 571,753 filed Jan. 17, 1984, now abandoned.

The invention relates to a sliding caliper disc brake, particularly for motor vehicles.

The invention concerns more particularly a disc brake having a caliper mounted for sliding by means of two axial pins on a fixed support, operating means being associated with the caliper in order to urge directly a first friction element directly against a first face of the disc and, by reaction through the sliding caliper, to urge a second friction element against the other face of the disc, the pins being fastened to the caliper and passing through slide guide bores formed in the fixed support.

A brake of this kind has been described in French Pat. No. 74-36 265 published under No. 2,289,799. This patent describes a disc brake having a sliding caliper of which a central portion passes above the disc in such a manner as to receive a friction element and, when required, to urge the latter into frictional engagement against the rotating disc when said caliper slides with the aid of pins which are fixed relative to the caliper, disposed one on each side of the said central portion and passing through slide guide bores formed in a fixed support. This brake nevertheless has the disadvantage of requiring the removal of one pin and the rotation of the caliper around the other pin in order to permit the replacement of the friction elements. This operation, although simple, entails the risk of deterioration of the quality of the sliding of the caliper, for example through the soiling of the sliding contact zones, and also the risk of deterioration of the brake fluid supply pipe situated, for example, between the master cylinder of the vehicle and the brake motor associated with the caliper.

The invention seeks to provide a sliding caliper disc brake in which these disadvantages are avoided.

To this end, the invention proposes a disc brake having a slidably mounted caliper, of the type described above, in which the fixed support comprises two arms in which the slide guide bores are formed, these two arms extending axially beyond the periphery of the disc which, when it turns in the forward direction of rotation, defines a front arm and a rear arm of the fixed support, and in which disc brake said caliper has two openings formed in a portion straddling the disc, a first opening receiving the rear arm and the corresponding pin and permitting the radial extraction of the friction elements, and a second opening receiving said front arm and the corresponding pin.

With this arrangement the friction elements can be extracted radially through the first opening, the risk of deterioration of the sliding and of the brake fluid pipe is eliminated, and the reduction in the rigidity of the caliper because of the first opening is compensated by an arched portion situated between the first and second openings in such a manner as to provide maximum arch rigidity at the position of the front arm of the fixed support where the caliper, subjected on the one hand to the hydraulic pressure and on the other hand to the thrust due to the torque, undergoes maximum deformation, without any increase in the radial dimension of the brake.

Figure 2:
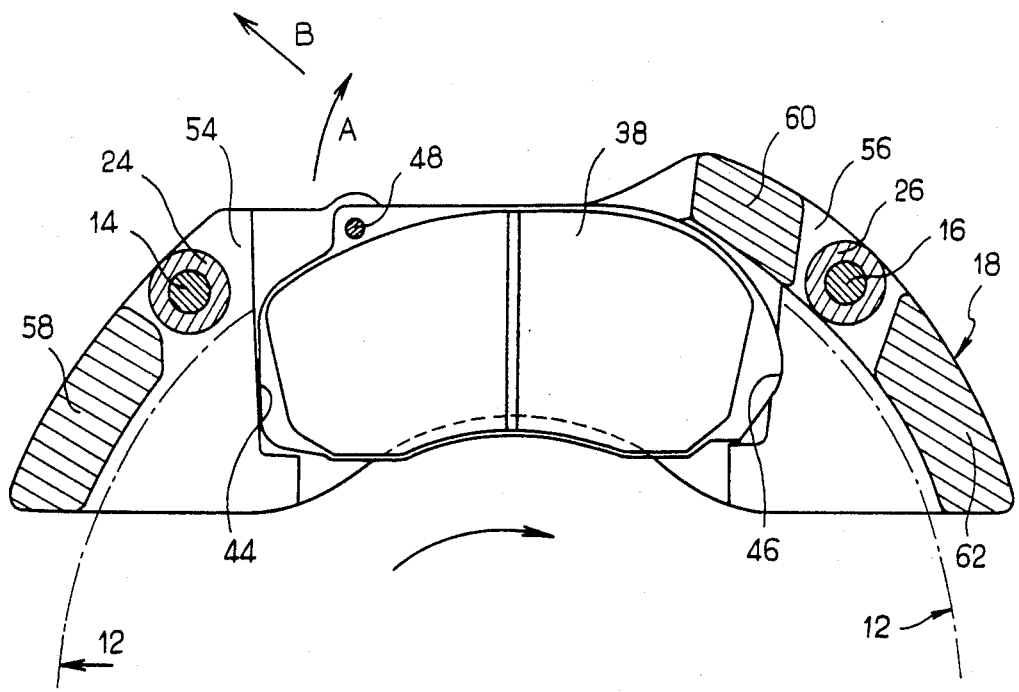
Figure 3:
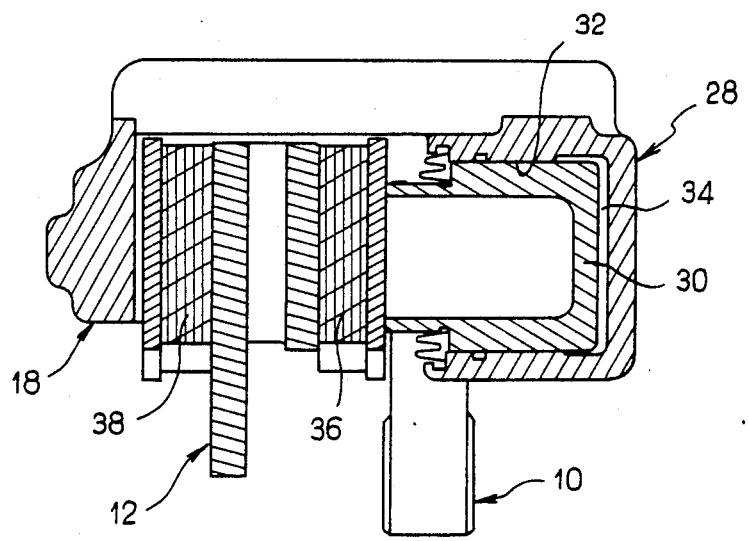

One embodiment of the invention will now be described as a non-limiting example and with reference to the accompanying drawings, in which:

FIG. 1 is a top view of a disc brake constructed in accordance with the invention, FIG. 2 is a view in section on the line 2—2 in FIG. 1, and FIG. 3 is a view in section on the line 3—3 in FIG. 1.

The disc brake shown in FIGS. 1 to 3 comprises a fixed support 10 designed to be associated with a fixed part (not shown) of the vehicle and comprising, in the embodiment illustrated, a plate disposed near a disc 12 designed to rotate with a vehicle wheel (not shown). The fixed support 10 receives a movable caliper 18, which is slidable with the aid of two circumferentially spaced axial pins 14 and 16 and which straddles the disc. The axes of the pins 14 and 16 are substantially parallel to the axis of rotation of the disc 12. As can be seen more particularly in FIG. 1, the pins 14 and 16 are fixed relative to the caliper 18 and pass in bores 20 and 22 formed respectively in the arms 24 and 26 of the fixed support 10. The caliper 18 comprises, in a conventional manner, operating means consisting of a hydraulic brake motor 28, which in the embodiment shown comprises twin motors each having a piston 30 sliding in a bore 32 formed in the caliper 18 and being sensitive to the pressure prevailing in a control chamber 34 adapted to be connected to a pressure source, such as, for example, the master cylinder (not shown) of the vehicle. The pistons 30 are disposed in such a manner as to urge directly a first friction element or inner element 36 against a first face of the disc 12 when the pressurized fluid is admitted into the chamber 34. By reaction, the caliper 18 is able to move axially by sliding on the pins 14 and 16 in order to urge a second friction element or outer element 38 against the other face of the disc 12. As shown in FIG. 1, the inner friction element 36 is supported for sliding and anchored by circumferentially spaced axial edges 40 and 42 formed on the arms 24 and 26 of the fixed support 10. The outer friction element 38 is held and anchored on circumferentially spaced axial edges 44 and 46 formed on the caliper 18. If the forward direction of rotation of the disc 12 is designated AV, the arm 24 can be defined as being the rear arm and the arm 26 as being the front arm. According to the invention, the caliper 18 has a first opening 54 through which the pin 14 passes and in which the arm 24 is placed, this opening 54 permitting the radial extraction of the friction elements, as will be seen below. The caliper 18 has a second opening 56, through which the pin 16 passes and which receives the arm 26 of the fixed support. Referring to FIG. 2, it can be seen that the axial edges 44 and 46, receiving the outer friction element 38, are rounded in such a manner as to be able to rock the friction element 38 in accordance with the arrow A and to enable it then to be extracted from the caliper by moving it in the direction of the arrow B, by way of the first opening 54. The same applies to the inner element 36. A pin 48 holds the inner and outer friction elements relative to the caliper 18 and to the fixed support 10, passing through holes situated opposite one another and formed in succession in the caliper 18, the friction elements 38 and 36, and then the fixed support 10. A securing pin 50 placed between the caliper 18 and the friction element 38 axially locks the pin 48 relative to the caliper. Referring to FIG. 1, it can be seen that the two openings 54 and 56 define three arch portions, the portions 58 and 60 bounding the opening 54 and the portions 60 and 62 bounding the opening 56. The portions 60 and 62, which are relatively close to one another, give the caliper 18 sufficient rigidity in the zone where maximum stresses and strains occur, that is to say where the loads due to the hydraulic pressure and the braking torque are applied.

From the description given above it will be understood that, as a result of the invention, the friction elements can be extracted radially without dismantling the sliding zones and without risk of damaging the brake fluid pipe, and that this is possible without reducing the rigidity of the caliper and without increasing its radial dimension.

It is quite obvious that the invention is not limited to the embodiment illustrated; for example, a different method of fastening and anchoring the friction elements could be conceiVed, without thereby departing from the scope of the invention.

It is also possible, if necessary, to increase the rigidity of the caliper by using the pins 14 and 16 for prestressing the two caliper portions situated one on each side of the disc, but this solution forms the object of another patent application filed by the Applicant on the same date.

I claim:

1. A disc brake having a caliper mounted for sliding by means of two axial pins on a fixed support, operating means being associated with the caliper in order to urge directly a first friction element against a first face of the disc and, by reaction through the caliper, to urge a second friction element against the other face of the disc, the pins being fastened to the caliper and passing through slide guide bores formed in support arms of the fixed support which extend axially beyond the periphery of the disc to define a front support arm and a rear support arm, characterized in that said caliper includes two asymetrical through openings bounded by inboard and outboard caliper portions and by only two side arms and a single middle arm extending over the disc to join together the inboard and outboard caliper portions, a first of said two through openings receiving therein and exposing said rear support arm and associated pin and permitting radial extraction of the friction elements therethrough because the first through opening is defined by a perimeter uninterrupted by any caliper structure extending therethrough, and a second of said two through openings receiving therein and exposing said front support arm and the corresponding pin, the through openings separated by the single middle arm that extends radially above the friction pads and closely adjacent one of the side arms at the perimeter of said second through opening in order to increase the rigidity of the one side arm, the second through opening dimensioned to receive without interference only the front support arm of the fixed support, and the friction elements having curved edges to enable the friction elements to be tilted and removed at an acute angle relative to the caliper, the curved edge of each friction element comprising a rounded edge about which said friction element pivots during extraction thereof.

2. The disc brake according to claim 1, characterized in that a lateral pin is fastened to and extends between the caliper and fixed support and passes axially through the first through opening to prevent the radial extraction of the friction elements.

3. The disc brake according to claim 2, characterized in that the friction elements have openings receiving the lateral pin therein.

4. The disc brake according to claim 3, characterized in that the lateral pin is disposed in said first through opening and opposite said middle arm.

5. The disc brake according to claim 1, characterized in that said rounded edge is disposed radially between said middle arm.

* * * * *